United States Patent Office

3,007,772
Patented Nov. 7, 1961

---

3,007,772
PREPARATION OF METALLIC FLUORIDES
Franciszek Olstowski, Freeport, Tex., assignor to The Dow Chemical Company, Midland, Mich., a corporation of Delaware
No Drawing. Filed May 23, 1957, Ser. No. 661,035
5 Claims. (Cl. 23—88)

This invention relates to a method of preparing uranium, boron, yttrium, and magnesium fluorides and is more particularly concerned with a method of producing such fluorides directly from the corresponding metallic oxides.

Various attempts have been made to prepare the metallic fluorides by reacting metallic oxides with fluorocarbons, see, for example, Ruff and Keim, Zeitschrift für Anorganische und Allgemeine Chemie, 192, 249–256 (1930). However, it was shown that the fluorocarbons were extremely temperature-stable and reaction-inert thereby suggesting that such fluorocarbons would not be operative as reaction intermediates. In certain co-pending applications, a relatively cheap method of preparing fluorocarbons has been described and these cheap fluorocarbons open up new avenues for preparing various fluorinated compounds. In view of the above reference which states that a long list of metals including copper, silver, mercury, boron, lead, tungsten, iron, etc. showed no reaction with carbon tetrafluoride at temperatures as high as the softening point of glass, probably below 650 degrees centigrade, it was thought that fluorocarbons were unreactive with various metallic oxides. It was, therefore, unexpected that the oxides of magnesium, boron, yttrium, and uranium would react with fluorocarbons to prepare the corresponding metallic fluorides.

The process of the present invention comprises heating at a temperature of 700 degrees centigrade, a metallic oxide in the group of magnesium, boron, yttrium or uanium with fluorocarbons to prepare the corresponding metallic fluorides. The reaction is usually conducted by passing a stream of fluorocarbon gases over the metal oxide contained within a reactor heated to the proper temperature. The selection of a particular temperature will be dependent upon the specific metallic oxide used, the rate of reaction desired, and in the case of magnesium oxide the type of magnesium oxide used. If the magnesium oxide used is the reactive type (light burned), a temperature of about 700 to 850 degrees centigrade gives a reasonable reaction rate while the use of "dead burned" magnesium oxide, indicates the employment of temperatures in excess of about 900 degrees centigrade is desirable to obtain the usual yields of magnesium fluoride. Alternatively, with yttrium oxide, at temperatures between about 700 and 800 degrees centigrade, predominantly YOF is formed, while at temperatures above about 800 degrees centigrade, substantially pure $YF_3$ is prepared. In any event, a temperature of at least 700 degrees centigrade must be employed if the metallic fluoride is to be formed. The maximum temperature which may be used is limited to the reactor construction and heating means employed.

Fluorocarbons, such as carbon tetrafluoride, hexafluoroethane, octafluoropropane, etc. are suitable, and mixtures of these gases may be used as well as the gases themselves. An excess of fluorocarbon is usually employed and the rate of introduction of the fluorocarbon into the reactor must be fast enough to insure contact between the reactants, containing the metallic oxide, but not too fast to cool the reactor below the desired reaction temperature. The amount of reaction will be dependent in part upon the reaction time, the more reaction time the more of the metallic oxide which will be reacted, and the method of reaction, a fluid bed of oxide being more advantageous than a fixed bed in most instances.

Separation of the metallic fluoride is readily accomplished by conventional methods usually used for separating metallic oxides from their fluorides.

The following examples are given to illustrate the process of the present invention but are not to be construed as limiting the invention thereto.

*Example I*

Approximately 10 grams of an uranium oxide, containing primarily $U_3O_8$, were placed in a graphite boat and the boat placed in a stainless steel tube. The tube was heated in a tube furnace to a temperature of 700 degrees centigrade and three cubic feet of a mixture of fluorocarbon gases (about 50 mole percent $CF_4$ and 50 mole percent $C_2F_6$) were placed through the tube over a period of five hours. At the end of this time, the tube was cooled, the graphite boat removed, and the reaction product analyzed by wet analysis for fluoride ion content. It was thus determined that 21% of the uranium present was converted to $UF_4$.

*Example II*

When the procedure of Example I was repeated at 850 and 1,000 degrees centigrade, 18.2% of the reaction product was $UF_4$ at 850 degrees centigrade and 91% at 1,000 degrees centigrade. The 1,000 degrees centigrade product was also identified by X-ray analysis to confirm the presence of $UF_4$.

*Example III*

In a manner similar to that of Example I magnesium oxide (Dow C–160) was reacted with fluorocarbon gases at 700, 850, and 1,000 degrees centigrade to give a reaction product containing magnesium fluoride in the following amounts:

| Temperature: | Percent $MgF_2$ in reaction product |
|---|---|
| 700 | 35.4 |
| 850 | 92.2 |
| 1,000 | 81.3 |

*Example IV*

In a manner similar to that of Example I, a one inch tubular graphite reactor was charged with 20 grams of $B_2O_3$, heated to 900 degrees centigrade and a 50/50 mole percent $CF_4$—$C_2F_6$ passed through the reactor at a rate of 20 cubic centimeters per minute for two hours. The gases issuing from the reactor, upon analysis by infrared showed that the effluent gases contained the following volume percent:

| | |
|---|---|
| $CO_2$ | 22.2 |
| $CO$ | 11.1 |
| $CF_4$ | 11.1 |
| $C_2F_6$ | 27.8 |
| $BF_3$ | 27.8 |

The residual $B_2O_3$ indicated that approximately four grams of $BF_3$ were produced.

*Example V*

In a manner similar to that of Example I, a one inch tubular graphite reactor was charged with 10 grams of $Y_2O_3$, heated to 950 degrees centigrade and 12 liters of a 53.5 mole percent $CF_4$ and 46.5 mole percent $C_2F_6$ mixture passed thereover during a period of 4 hours while the reactor was maintained at 950 degrees centigrade.

This procedure was repeated at various temperatures and the results are tabulated as follows:

| Temperature: | Product |
|---|---|
| 950° C | $YF_3$ |
| 900° C | $YF_3$ |
| 850° C | $YF_3$ |
| 800° C | $YF_3$ and YOF |
| 750° C | $YF_3$ and YOF |

The 950 degrees centigrade was analyzed by wet chemical methods and found to contain 37.7 percent fluorine, 58.9 percent yttrium and approximately 3.5 percent free carbon.

Various modifications may be made in the present invention without departing from the spirit or scope thereof and it is to be understood that I limit myself only as defined in the appended claims.

What is claimed is:

1. The process which comprises: contacting a material selected from the group consisting of oxides of magnesium, boron, and yttrium with an excess of fluorocarbon containing up to 3 carbon atoms, at a temperature above 700 degrees centigrade, and, separating the corresponding metallic fluoride from the reaction mixture.

2. The process which comprises: contacting a material selected from the group consisting of oxides of magnesium, boron, and yttrium with an excess of fluorocarbon containing up to 3 carbon atoms, at a temperature above 850 degrees centigrade, and, separating the corresponding metallic fluoride from the reaction mixture.

3. The process which comprises: contacting magnesium oxide with an excess of a mixture of carbon tetrafluoride and hexafluoroethane at a temperature of about 850 degrees centigrade, and, separating the resulting magnesium fluoride from the reaction mixture.

4. The process which comprises: contacting boron oxide with a mixture of carbon tetrafluoride and hexafluoroethane at a temperature about 900 degrees centigrade, and, separating $BF_3$ from the reaction mixture.

5. The process which comprises: contacting yttrium oxide with a mixture of carbon tetrafluoride and hexafluoroethane at a temperature above about 800 degrees centigrade, and, separating $YF_3$ from the reaction mixture.

References Cited in the file of this patent

UNITED STATES PATENTS

| | | |
|---|---|---|
| 2,674,518 | Evers et al. | Apr. 6, 1954 |
| 2,677,592 | Carter | May 4, 1954 |
| 2,770,526 | Lander | Nov. 13, 1956 |
| 2,852,337 | Rosenfeld | Sept. 16, 1958 |

OTHER REFERENCES

The Chemistry of Uranium, Part I, by Joseph J. Katz et al., 1st ed., 1951, McGraw-Hill Book Co., N.Y., pp. 362–364.

Zeitschrift fur Anorgan. and Allgemeine Chemie Band 192 (1930), pp. 249–256.

Bigelow: Ind. and Eng. Chem., vol. 39, No. 3, March 1947, pages 360–364.

Mellor: Comprehensive Treatise on Inorganic and Theoretical Chemistry, vol. 2 (1922), page 9, Longmans, Green and Co.; Supplement II, part I, page 208, 1956.

Simons: Fluorine Chemistry, vol. 1, pages 432, 433 (1950), Academic Press, Inc., N.Y.

Prigent Comptes Rendus, vol. 238, pp. 102–4 (1954).